United States Patent
Chen et al.

(10) Patent No.: US 7,798,664 B2
(45) Date of Patent: Sep. 21, 2010

(54) FIXING APPARATUS FOR REDUCING NOISE OF BACKLIT UNIT

(75) Inventors: Cheng-Hsiang Chen, Tainan (TW); Yu Suzuki, Tainan (TW)

(73) Assignee: Chimei Innolux Corporation, Miao-Li County (TW)

( * ) Notice: Subject to any disclaimer, the term of this patent is extended or adjusted under 35 U.S.C. 154(b) by 192 days.

(21) Appl. No.: 12/164,425

(22) Filed: Jun. 30, 2008

(65) Prior Publication Data

US 2008/0298068 A1  Dec. 4, 2008

Related U.S. Application Data

(62) Division of application No. 11/170,757, filed on Jun. 28, 2005, now Pat. No. 7,407,305.

(30) Foreign Application Priority Data

Jun. 30, 2004  (TW) .............................. 93119803 A

(51) Int. Cl.
*G09F 13/04* (2006.01)
*F21V 17/02* (2006.01)

(52) U.S. Cl. ...................... 362/97.1; 362/277; 362/280; 362/319

(58) Field of Classification Search ................ 362/97.1, 362/97.2, 97.4, 606, 607, 618, 627, 277, 362/280, 319, 355

See application file for complete search history.

(56) References Cited

U.S. PATENT DOCUMENTS

2003/0231499 A1  12/2003  Kao

FOREIGN PATENT DOCUMENTS

JP            11084351 A      3/1999

*Primary Examiner*—Thomas M Sember
(74) *Attorney, Agent, or Firm*—Townsend and Townsend and Crew LLP

(57) ABSTRACT

A fixing apparatus, applied to a diffuser plate of a backlight unit (BLU), includes a fixing groove and a positioning piece. The fixing groove is formed at the frame and symmetrically related to one end of a centrosymmetric line of a diffuser plate. A first pair of edges are set at two sides of the centrosymmetric line. A third edge connects the first pair of edges cutting across the centrosymmetric line. The positioning piece is located within the fixing groove. The positioning piece is separated from the first pair of edges of the fixing groove at a first distance, and separated from the third edge of the fixing groove at a second distance, wherein the first distance is smaller than the second distance.

18 Claims, 4 Drawing Sheets

FIXING APPARATUS FOR REDUCING NOISE OF BACKLIT UNIT

CROSS-REFERENCE TO RELATED APPLICATION

This patent application is a division of U.S. application Ser. No. 11/170,757, filed Jun. 28, 2005, entitled "Fixing Apparatus For Reducing Noise of Backlit Unit," which claims priority to Taiwanese patent Application No. 93119803, filed Jun. 30, 2004 and incorporated by reference herein for all purposes.

BACKGROUND OF THE INVENTION

1. Field of the Invention

The invention relates in general to displays, and in particular to a fixing apparatus for reducing the undesired noise inside the backlight unit, particularly noise of the diffuser plate or other optical sheets of the backlight unit when the LCD module is shaken.

2. Description of the Prior Art

With the advantages of handy size, light weight, low power consumption and no radiation contamination, liquid crystal displays ("LCD") have been widely used in recent years. In the commercial market, the LCD applications include the portable products such as personal digital assistants (PDA), regular size products such as monitors of laptop or desktop computers, and large size products such as 30"~40" LCD-TVs.

The LCD is assembled by a display unit and a backlight unit housed in a case with a mold frame. The display unit comprises a display panel, a printed circuit board for processing the signals, and a tape carrier package (TCP) for providing mechanical support. The backlight unit disposed under the display unit provides a uniform light to the display unit of the LCD.

Backlight units are generally divided into two types: a side edge backlight and a direct type backlight, according to the disposition of the light source. Generally Speaking, the side edge backlight unit is applied to the small or regular size (about 20" or less) LCD, and the direct type backlight unit is applied to the large size LCD or TV monitor. The side edge backlight unit, for example, comprises a light source such as the cold cathode fluorescent lamps (CCFL) or the spot light disposed near the sidewall, a light guiding plate, a diffuser plate (for amplifying the light) and the optical sheets for illuminating the light uniformly and increasing the lighting efficiency. The LCD TV requires higher standard at brightness and wide viewing angle; thus, the direct type backlight unit having more lamps disposed below the display panel becomes widely used in the large size LCDs or TV monitors. Also, only the diffuser plate and the optical sheets are required in the direct type backlight unit, it is no need to use the light guiding plate since the light straightly comes from the bottom of the backlight unit. Accordingly, the direct type backlight unit requires fewer components than the side edge backlight unit.

FIG. 1 schematically shows a cross sectional view of a conventional direct type backlight unit. The direct type backlight unit at least comprises a casing 10, a reflective plate 12, the light source 14, a diffuser plate 16 and several diffuser films 18. The light source 14 (e.g. U-shaped Lamp) arranged in the casing 10 emits the light upward, and the light is uniformed by the diffuser plate 16 and the diffuser films 18. The reflective plate (e.g. an aluminum plate) disposed at the bottom surface of the casing 10 is used for minimizing the loss of light and increasing the light efficiency. The backlight unit is further assembled with the display unit (not shown in FIG. 1) to complete a LCD.

When the product having the backlight unit is in use, the diffuser plate 16 and the diffuser films 18 are thermal and moist expanded; thus, it is important to make a space between the diffuser plate 16 (diffuser films 18) and the frame 11 of the casing 10. Otherwise, the diffuser plate 16 (diffuser films 18) is deformed and bended upward to press the display unit after thermal or moisture expansion. This in turn has a bad influence on the display quality of the LCD.

Such thermal expansion ($\Delta Lt$) is given by the equation (1):

$$\Delta Lt = L \times \Delta T \times \alpha 1 \tag{1}$$

where L is total length, $\Delta T$ is temperature difference and $\alpha 1$ is thermal expansion coefficient.

The moisture expansion ($\Delta Lm$) is given by the equation (2):

$$\Delta Lm = L \times \alpha 2 \tag{2}$$

where L is total length and $\alpha 2$ is moisture expansion coefficient.

Take a 30" diffuser plate made by polycarbonate (PC) as an example. The space g1 saved for the 30" diffuser plate and relating to the length of the diffuser plate can be determined by the following calculation.

It is assumed that the temperature is changed between 25° C. (room temperature) and 70° C. The 30" diffuser plate is 664.8 mm in length. The thermal expansion coefficient $\alpha 1$ of polycarbonate is about 6~8×10-5 mm. The moisture expansion coefficient $\alpha 2$ of polycarbonate is about 0.08%. The mechanical tolerance of polycarbonate is about 1.0 mm.

The thermal expansion ($\Delta Lt$) and the moisture expansion ($\Delta Lm$) are:

$$\Delta Lt = L \times \Delta T \times \alpha 1 = 664.8 \times (70-25) \times 7 \times 10-5 = 2.09 \text{ (mm)}$$

$$\Delta Lm = L \times \alpha 2 = 664.8 \times 0.08\% = 0.53 \text{ (mm)}$$

Thus, the space g1 saved for the 30" diffuser plate and relating to the length of the diffuser plate is:

$$g1 = (2.09 + 0.53 + 1.0)/2 = 1.81 \text{ (mm)}$$

Similarly, the space g2 saved for the 30" diffuser plate and relating to the width of the diffuser plate can be determined by using the equations (1) and (2).

According to the description above, the LCD in larger size requires the larger diffuser plate and the spaces (g1 and g2) saved for adapting the expansion of the diffuser plate. However, the diffuser plate 16 and the diffuser films 18 of the conventional backlight unit are stacked instead of fixing on the frame 11. After the display unit is assembled with the frame 11, the diffuser plate 16 and the diffuser films 18 in a stack can be kept within the LCD. If the LCD is moved or shaken, the diffuser plate 16 and the diffuser films 18 will strike the edges of the frame 11 due to the existence of the spaces (g1 and g2), so as to make the abnormal sound (i.e. noise). The larger diffuser plate (which means it is bulky) causes the bigger noise. Also, the larger spaces saved for the larger diffuser plate amplifies the noise defect.

Therefore, there is a need in the art for improved display apparatuses.

BRIEF SUMMARY OF THE INVENTION

Embodiments in accordance with the present invention provide a fixing apparatus for reducing the noise inside a backlight unit. The design of the fixing apparatus, considering the expansion of the diffuser plate, can effectively reduce (even eliminate) the noise caused by the impact between the diffuser plate (or other optical sheets) and a solid (e.g. a frame) when the LCD module is shaken.

The invention achieves the objects by providing a fixing apparatus applied to a diffuser plate of a backlight unit (BLU). The fixing apparatus comprises a receiving portion and a positioning portion. The receiving portion is symmetrically formed at a first centrosymmetric line of the diffuser plate, and a first pair of edges of the receiving portion set at two sides of the first centrosymmetric line. The positioning portion, located within the receiving portion, and a first distance is formed between the positioning portion and the first pair of edges of the receiving portion. Also, the first distance is determined according to a mechanical tolerance of the diffuser plate. When the diffuser plate tends to move along a direction of a second centrosymmetric line perpendicular to the first centrosymmetric line, the movement of the diffuser plate is constrained by the positioning portion.

In addition, the receiving portion and a positioning portion could be a fixing hole and a positioning pin. Also, the receiving portion and a positioning portion could be a fixing groove and a positioning piece.

An embodiment of a fixing apparatus in accordance with the present invention, applied to a diffuser plate of a backlight unit (BLU), comprises, a receiving portion, symmetrically formed at a first centrosymmetric line of a diffuser plate, and a first pair of edges of the receiving portion setting at two sides of the first centrosymmetric line. A positioning portion is located within the receiving portion such that a first distance is formed between the positioning portion and the first pair of edges of the receiving portion, the first distance determined by a mechanical tolerance of the diffuser plate. Movement of the diffuser plate along a direction of a second centrosymmetric line perpendicular to the first centrosymmetric line, is constrained by the positioning portion.

An alternative embodiment of a fixing apparatus in accordance with the present invention, applied to a diffuser plate of a backlight unit (BLU), comprises, a fixing hole, symmetrically formed at a centrosymmetric line of a diffuser plate, a first pair of edges setting at two sides of the centrosymmetric line, and a second pair of edges cutting across the centrosymmetric line. A positioning pin is located within the fixing hole, separated from the first pair of edges of the fixing hole at a first distance, and separated from the second pair of edges of the fixing hole at a second distance, wherein the first distance is smaller than the second distance.

An embodiment of a fixing apparatus in accordance with the present invention is applied to a diffuser plate of a backlight unit (BLU), and the diffuser plate placed on a frame of the BLU. The fixing apparatus comprises a fixing groove, formed at the frame and symmetrically related to one end of a centrosymmetric line of a diffuser plate, a first pair of edges setting at two sides of the centrosymmetric line, and a third edge joining the first pair of edges cutting across the centrosymmetric line. A positioning piece is located within the fixing groove and separated from the first pair of edges of the fixing groove at a first distance, and separated from the third edge of the fixing groove at a second distance, wherein the first distance is smaller than the second distance.

An embodiment of a backlight unit (BLU) in accordance with the present invention, comprises, a housing comprising a frame configured to enclose a plurality of backlight components, and a fixing apparatus configured to constrain movement of a diffuser plate within the housing. The fixing apparatus comprises a receiving portion symmetrically formed at a centrosymmetric line of the diffuser plate, a first pair of edges of the receiving portion setting at either sides of the centrosymmetric line, another edge of the receiving portion cutting across the centrosymmetric line. A positioning portion is located within the receiving portion and separated from the first pair of edges at a first distance, and separated from another edge of the receiving portion at a second distance, wherein the first distance is smaller than the second distance.

An embodiment of a display device in accordance with the present invention, comprises, a backlight unit (BLU) comprising, a housing configured to enclose a plurality of backlight components of the BLU, the housing having a frame, and a diffuser plate placed on the frame and having a fixing apparatus for constraining the movement of the diffuser plate. The fixing apparatus comprises a receiving portion symmetrically formed at a centrosymmetric line of the diffuser plate, a first pair of edges of the receiving portion setting at either sides of the centrosymmetric line, another edge of the receiving portion cutting across the centrosymmetric line. A positioning portion is located within the receiving portion and separated from the first pair of edges at a first distance, the positioning portion separated from another edge of the receiving portion at a second distance, wherein the first distance is smaller than the second distance.

An alternative embodiment of a display device in accordance with the present invention, comprises, a backlight unit (BLU) comprising a housing enclosing a plurality of backlight components of the BLU, the housing having a frame and at least a first positioning component formed on the frame. A diffuser plate is placed on the frame and comprises a second positioning component, symmetrically formed at a centrosymmetric line of the diffuser plate, wherein the second positioning component assembled with the first positioning component fixes the diffuser plate on the frame.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE INVENTION

An embodiment in accordance with the present invention provides a fixing apparatus applied to the backlight unit to restrict the movement of the diffuser plate, so as to reduce the undesired noise (caused by the impact between the diffuser plate and the frame) inside the backlight unit when the LCD module is shaken. The fixing apparatus comprises a receiving portion and a positioning portion. The receiving portion is symmetrically formed at a first centrosymmetric line of the diffuser plate, and a first pair of edges of the receiving portion set at two sides of the first centrosymmetric line. The positioning portion is located within the receiving portion. A first distance is formed between the positioning portion and the first pair of edges of the receiving portion, and the first distance is determined according to a mechanical tolerance of the diffuser plate. When the diffuser plate tends to move along a direction of a second centrosymmetric line perpendicular to the first centrosymmetric line, the diffuser plate is constrained and able to move within the first distance.

The embodiments disclosed herein are for illustrating the invention, but not for limiting the scope of the invention. Additionally, the drawings used for illustrating the embodiments of the invention only show the major characteristic parts in order to avoid obscuring the invention. Accordingly, the specification and the drawings are to be regard as an illustrative sense rather than a restrictive sense.

First Embodiment

Figure 1:
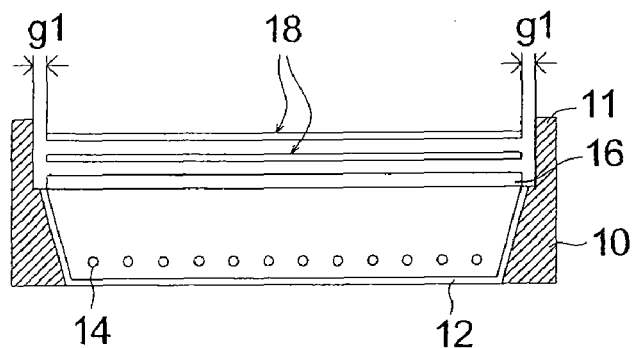
FIG. 1 schematically shows a cross sectional view of a conventional direct type backlight unit.
Figure 2A:
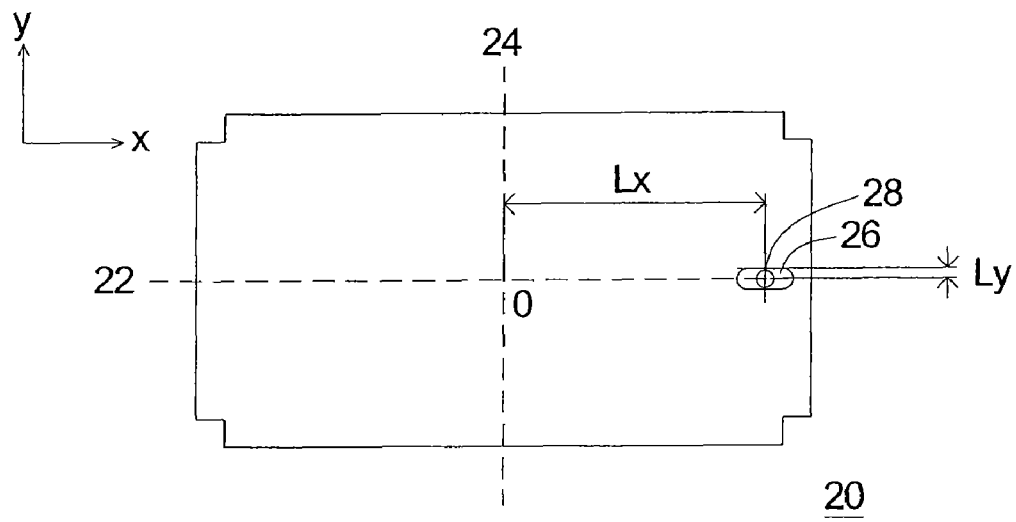
FIG. 2A schematically illustrates a diffuser plate having a fixing apparatus according to the first embodiment of the invention.
Figure 2B:
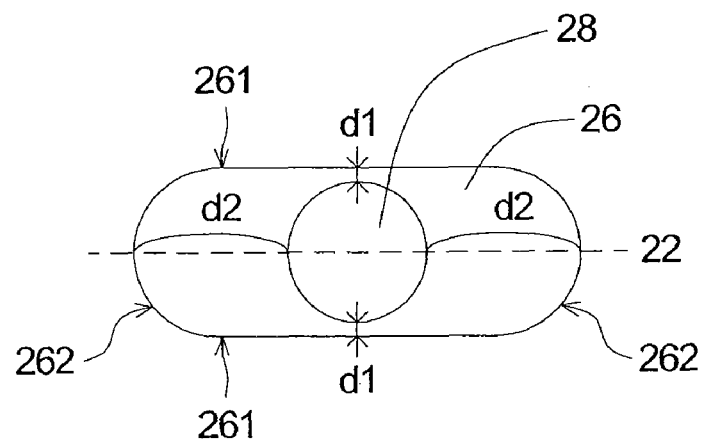
FIG. 2B is an enlarged view of the fixing apparatus of FIG. 2A.

FIG. 2A schematically illustrates a diffuser plate having a fixing apparatus according to a first embodiment of the present invention. FIG. 2B is an enlarged view of the fixing apparatus of FIG. 2A. In the first embodiment, a fixing hole 26 is configured on the diffuser plate as a receiving portion of the fixing apparatus, and a positioning pin 28 is formed as a positioning portion of the fixing apparatus.

As depicted in FIG. 2A and FIG. 2B, a first centrosymmetric line 22 (along the x-direction) and a second centrosymmetric line 24 (along the y-direction) of the diffuser plate 20 intersect at the symmetric center O. The fixing hole 26 is configured symmetrically along the first centrosymmetric line 22. The first pair of edges 261 of the fixing hole 26 set at two sides of the first centrosymmetric line 22, and the second pair of edges 262 cut across the first centrosymmetric line 22. The positioning pin 28 is located within the fixing hole 26. A first distance d1 and a second distance d2 from the positioning pin 28 to the first pair of edges 261 and the second pair of edges 262 are created, respectively. Also, the first distance d1 is smaller than the second distance d2.

According to the expansion theory, the expansion of the symmetric center O is zero (i.e. L=0 of the equations (1) and (2)). For the fixing hole 26, the distance Ly (in the y-direction) from the first pair of edges 261 to the first centrosymmetric line 22 is very small, the thermal expansion ΔLty and moisture expansion ΔLmy (using equations (1) and (2)) are negligible. Accordingly, the mechanical tolerance of the diffuser plate 20 is the only factor for determining the first distance d1. However, the expansion along the x-direction is a considerable effect. As shown in FIG. 2A, the distance Lx (in the x-direction) from the center of the fixing hole 26 to the symmetric center O is large, so that the thermal expansion ΔLtx, moisture expansion ΔLmx (using equations (1) and (2)) and the mechanical tolerance are all to be considered for determining the second distance d2. Consequently, the second distance d2 is larger than the first distance d1. If the diffuser plate 20 tends to move in the y(/−y)-direction, it is constrained by the positioning pin 28 and only moved within the first distance d1. Compared to the conventional design, the diffuser plate 20 having the fixing apparatus according to the first embodiment of the invention has a smaller space to move. Therefore, when the LCD module is shaken, the noise caused by the collision between the diffuser plate 20 and a solid (e.g. the frame) can be reduced using the fixing apparatus.

Second Embodiment

Figure 3A:
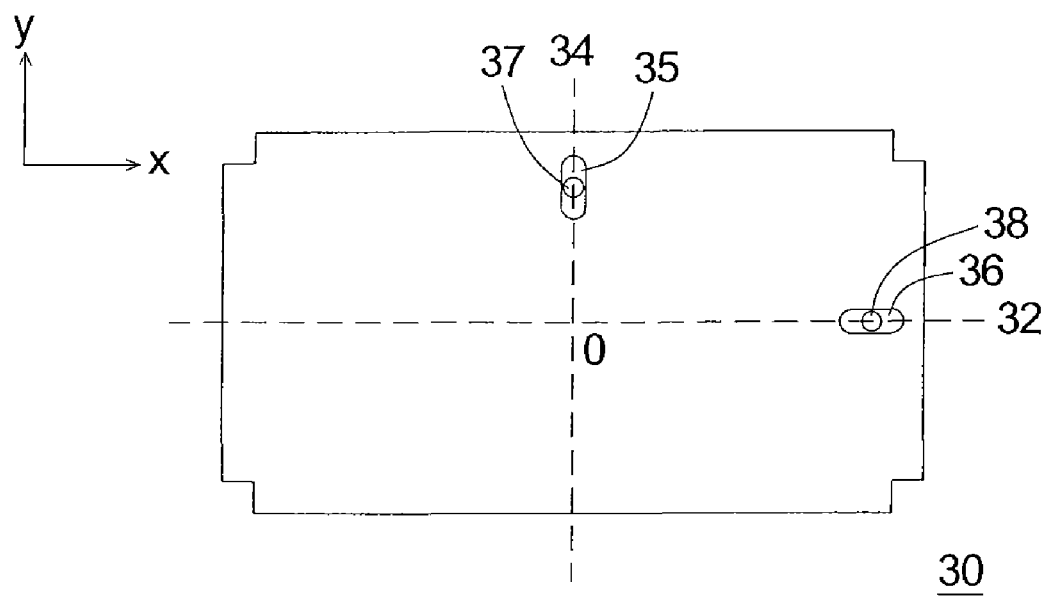
FIG. 3A schematically illustrates a diffuser plate having a fixing apparatus according to the second embodiment of the invention.
Figure 3B:
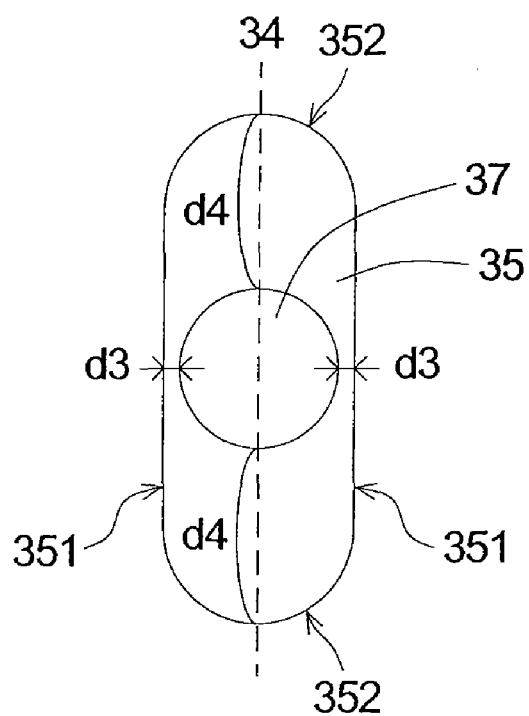
FIG. 3B is an enlarged view of the fixing apparatus in the y-direction of FIG. 3A.

FIG. 3A schematically illustrates a diffuser plate having a fixing apparatus according to a second embodiment of the present invention. FIG. 3B is an enlarged view of the fixing apparatus in the y-direction of FIG. 3A.

The major difference between the first embodiment and the second embodiment is that the movement of the diffuser plate 30 along the x-direction is also constrained in the second embodiment. In the second embodiment, a first fixing apparatus and a second apparatus are configured in the x-direction and y-direction, respectively.

As depicted in FIG. 3A and FIG. 3B, a first centrosymmetric line 32 (along the x-direction) and a second centrosymmetric line 34 (along the y-direction) of the diffuser plate 30 intersect at the symmetric center O. The first fixing apparatus of the diffuser plate 30 comprises a first fixing hole 36 and a first positioning pin 38. The enlarged view and detailed description of the first fixing apparatus are referred to FIG. 2B and the first embodiment. The second fixing apparatus of the diffuser plate 30 comprises a second fixing hole 35 and a second positioning pin 37.

The second fixing hole 35 is configured symmetrically along the second centrosymmetric line 34. The first pair of edges 351 of the fixing hole 35 set at two sides of the second centrosymmetric line 34, and the second pair of edges 352 cut across the second centrosymmetric line 34. The second positioning pin 37 is located within the second fixing hole 35. A third distance d3 and a fourth distance d4 from the second positioning pin 37 to the first pair of edges 351 and the second pair of edges 352 of the second fixing hole 35 are created, respectively. Also, the third distance d3 is smaller than the fourth distance d4.

For the second fixing hole 35, the expansion (including the thermal expansion ΔLtx and moisture expansion ΔLmx) along the x-direction is very small and almost negligible; thus, the mechanical tolerance of the diffuser plate 30 is the only factor for determining the third distance d3. On the other hand, the thermal expansion, moisture expansion and the mechanical tolerance are all to be considered for determining the fourth distance d4. If the diffuser plate 30 tends to move in the x(/−x)-direction, it is constrained by the second positioning pin 37 and only moved within the third distance d3. Also, the movement of the diffuser plate 30 in the y(/−y)-direction is constrained by the first positioning pin 38.

In the practical application, the third distance d3 can be identical to the first distance d1 since both are determined according to the mechanical tolerance of the diffuser plate 30. The mechanical tolerance only varies with the material of the diffuser plate.

Accordingly, the diffuser plate 30 of the second embodiment is restricted from moving not only along the y(/−y)-direction due to the constraint of the first positioning pin 38 of the first fixing apparatus, but also along the x(/−x)-direction due to the constraint of the second positioning pin 37 of the second fixing apparatus. Therefore, when the LCD module is shaken, the noise caused by the collision between the diffuser plate 30 and a solid (e.g. the frame) can be more effectively reduced.

Third Embodiment

Figure 4A:
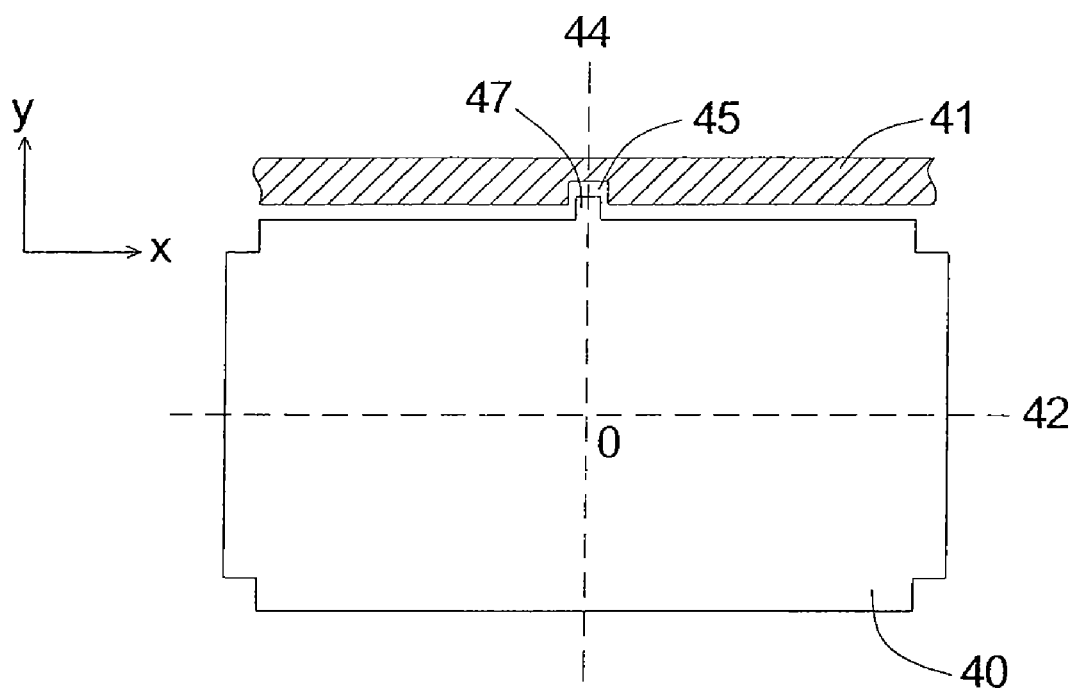
FIG. 4A schematically illustrates a diffuser plate having a fixing apparatus according to the third embodiment of the invention.
Figure 4B:
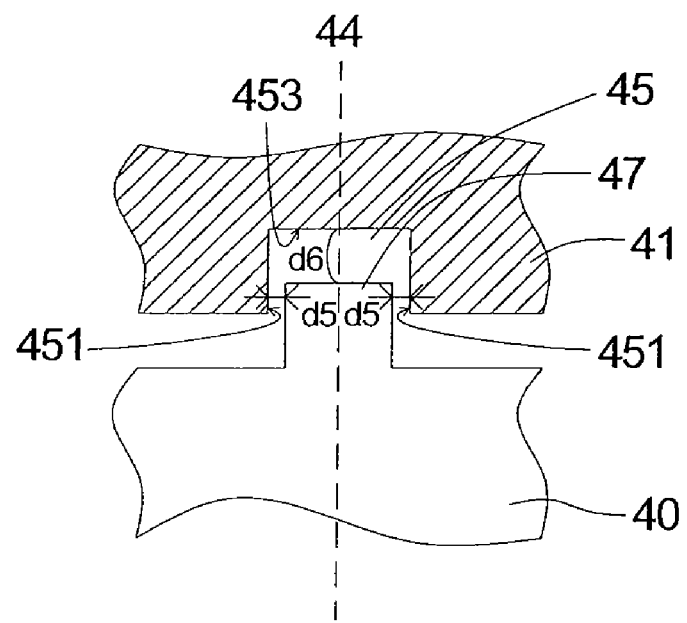
FIG. 4B is an enlarged view of the fixing apparatus of FIG. 4A.

FIG. 4A schematically illustrates a diffuser plate having a fixing apparatus according to a third embodiment of the present invention. FIG. 4B is an enlarged view of the fixing apparatus of FIG. 4A. In the third embodiment, a fixing groove 45 and a positioning piece 47 are respectively configured as a receiving portion and a positioning portion of the fixing apparatus. Preferably, the positioning piece 47 and the diffuser plate 40 are integrated as a whole, and the fixing groove 45 can be formed on the frame 41.

As depicted in FIG. 4A and FIG. 4B, a first centrosymmetric line 42 (along the x-direction) and a second centrosymmetric line 44 (along the y-direction) of the diffuser plate 40 intersect at the symmetric center O. The fixing groove 45 is configured symmetrically along the second centrosymmetric line 44. The first pair of edges 451 of the fixing groove 45 set at two sides of the second centrosymmetric line 44, and the third edge 453 (joining the first pair of edges 451) cuts across the second centrosymmetric line 44. The positioning piece 47 is located within the fixing groove 45. A fifth distance d5 and a sixth distance d6 from the positioning piece 47 to the first pair of edges 451 and the third edge 453 of the fixing groove 45 are created, respectively. Also, the fifth distance d5 is smaller than the sixth distance d6.

Similarly, the expansion of the symmetric center O is zero (i.e. L=0 of the equations (1) and (2)). For the positioning piece 47, the expansion (including the thermal expansion $\Delta Ltx$ and moisture expansion $\Delta Lmx$) along the x-direction is very small and almost negligible; thus, the mechanical tolerance of the diffuser plate 40 is the only factor for determining the fifth distance d5. If the diffuser plate 40 tends to move in the x(/−x)-direction, it is constrained by the positioning piece 47. Therefore, when the LCD module is shaken, the noise caused by the collision between the diffuser plate 40 and a solid (e.g. the frame) can be reduced.

Fourth Embodiment

Figure 5A:
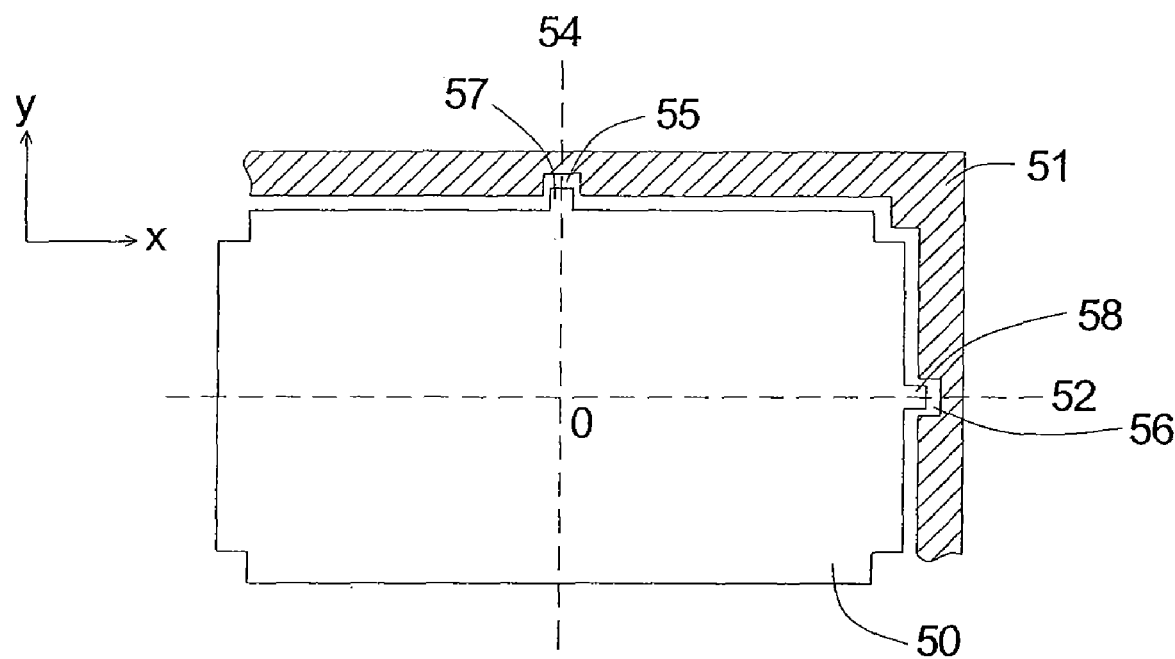
FIG. 5A schematically illustrates a diffuser plate having a fixing apparatus according to the fourth embodiment of the invention.
Figure 5B:
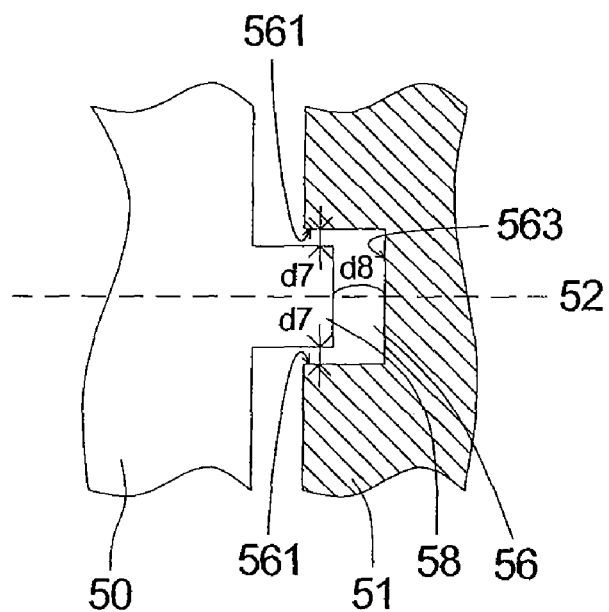
FIG. 5B is an enlarged view of the fixing apparatus in the x-direction of FIG. 5A.

FIG. 5A schematically illustrates a diffuser plate having a fixing apparatus according to a fourth embodiment of the present invention. FIG. 5B is an enlarged view of the fixing apparatus in the x-direction of FIG. 5A.

The major difference between the fourth embodiment and the third embodiment is that the movement of the diffuser plate 50 along the y-direction is also constrained in the fourth embodiment. In the fourth embodiment, a first fixing apparatus and a second apparatus are configured in the y-direction and x-direction, respectively.

As depicted in FIG. 5A and FIG. 5B, a first centrosymmetric line 52 (along the x-direction) and a second centrosymmetric line 54 (along the y-direction) of the diffuser plate 50 intersect at the symmetric center O. The first fixing apparatus of the diffuser plate 50 comprises a first fixing groove 55 and a first positioning piece 57. The enlarged view and detail description of the first fixing apparatus are referred to FIG. 4B and the third embodiment. The second fixing apparatus of the diffuser plate 50 comprises a second fixing groove 56 and a second positioning piece 58.

Similarly, the second positioning piece 58 is configured symmetrically at the first centrosymmetric line 52. The first pair of edges 561 of the second fixing groove 56 set at two sides of the first centrosymmetric line 52, and the third edge 563 (joining the first pair of edges 561) cuts across the first centrosymmetric line 52. The second positioning piece 58 is located within the second fixing groove 56. A seventh distance d7 and a eighth distance d8 from the positioning piece 58 to the first pair of edges 561 and the third edge 563 of the fixing groove 56 are created, respectively. Also, the seventh distance d7 is smaller than the eighth distance d8.

For the second positioning piece 58 at the first centrosymmetric line 52, the expansion (including the thermal expansion $\Delta Lty$ and moisture expansion $\Delta Lmy$) along the y-direction is very small and almost negligible; thus, the mechanical tolerance of the diffuser plate 50 is the only factor for determining the seventh distance d7. On the other hand, the thermal expansion, moisture expansion and the mechanical tolerance are all to be considered for determining the eighth distance d8. If the diffuser plate 50 tends to move in the y(/−y)-direction, it is constrained by the second positioning piece 58 and only moved within the seventh distance d7. Also, the movement of the diffuser plate 50 in the x(/−x)-direction is constrained by the first positioning piece 57.

In the practical application, the seventh distance d7 can be identical to the fifth distance d5 since both are determined according to the mechanical tolerance of the diffuser plate 50. The mechanical tolerance only varies with the material of the diffuser plate.

Accordingly, the diffuser plate 50 of the fourth embodiment can not be moved not only along the x(/−x)-direction due to the constraint of the first positioning piece 57 of the first fixing apparatus, but also along the y(/−y)-direction due to the constraint of the second positioning piece 58 of the second fixing apparatus. Therefore, when the LCD module is shaken, the noise caused by the collision between the diffuser plate 50 and a solid (e.g. the frame) can be more effectively reduced.

Although the fixing apparatus of the first or third embodiment is formed at the +x-direction or the +y-direction for reducing the colliding noise, the invention is not limited herein. The fixing apparatus could be formed at one of −x-direction and −y-direction. Also, the fixing apparatus of the second and fourth embodiments could be formed at the −x-direction and −y-direction.

In addition, the fixing apparatus with different mechanical structure can be applied to the same diffuser plate for achieving the purpose of effectively reducing the noise. For example, the fixing apparatus having a fixing hole and a positioning pin as illustrated in the first embodiment can be applied at the first centrosymmetric line (along the x-direction) of the diffuse plate, and the fixing apparatus having a fixing groove and a positioning piece as illustrated in the third embodiment can be applied at the second centrosymmetric line (along the y-direction) of the diffuse plate.

Moreover, four fixing apparatuses could be respectively formed at the +x-direction, −x-direction, +y-direction and −y-direction in the practical application, and the mechanical structures of four fixing apparatus could be optionally selected from the structure of the first embodiment (a fixing hole and a positioning pin) and the structure of the third embodiment (a fixing groove and a positioning piece).

Although the fixing apparatus for positioning the diffuser plate is illustrated according to the aforementioned embodiments, the fixing apparatus of the invention can be applied for positioning the diffuser films or other optical sheets. For example, the fixing holes (or the positioning pieces) can be formed at the diffuser plate and the diffuser films, and the positioning pin (or the fixing groove) is assembled with the fixing holes (or the positioning pieces) after the diffuser plate and the diffuser film are placed in a stack; thus, noise caused by the impact between the diffuser plate, the diffuser films and the solid (e.g. the frame) can be greatly reduced.

While the invention has been described by way of examples and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fixing apparatus, applied to a diffuser plate of a backlight unit (BLU) and the diffuser plate placed on a frame of the BLU, the fixing apparatus comprising:
a fixing groove, formed at the frame and symmetrically related to one end of a centrosymmetric line of the diffuser plate, and a first pair of edges setting at two sides of the centrosymmetric line, and a third edge joining the first pair of edges cutting across the centrosymmetric line; and
a positioning piece, located within the fixing groove, and separated from the first pair of edges of the fixing groove at a first distance, and separated from the third edge of the fixing groove at a second distance,
wherein the first distance is smaller than the second distance.

2. The fixing apparatus according to claim 1, wherein the first distance is determined according to an overall expansion coefficient of the diffuser plate.

3. The fixing apparatus according to claim 1, wherein the second distance is determined according to a mechanical tolerance of the diffuser plate.

4. The fixing apparatus according to claim 1, wherein the positioning piece is projected from the diffuser plate.

5. The fixing apparatus according to claim 1, wherein the positioning piece is configured at a direction of the centrosymmetric line and integrated with the diffuser plate.

6. A backlight unit (BLU) comprising:
a housing comprising a frame configured to enclose a plurality of backlight components; and
a fixing apparatus configured to constrain movement of a diffuser plate within the housing, the fixing apparatus comprising,
a fixing groove, formed at the frame and symmetrically related to one end of a centrosymmetric line of the diffuser plate, and a first pair of edges setting at two sides of the centrosymmetric line, and a third edge joining the first pair of edges cutting across the centrosymmetric line; and
a positioning piece, located within the fixing groove, and separated from the first pair of edges of the fixing groove at a first distance, and separated from the third edge of the fixing groove at a second distance,
wherein the first distance is smaller than the second distance.

7. The backlight unit according to claim 6, wherein the first distance is determined according to an overall expansion coefficient of the diffuser plate.

8. The backlight unit according to claim 6, wherein the second distance is determined according to a mechanical tolerance of the diffuser plate.

9. The backlight unit according to claim 6, wherein the positioning piece is projected from the diffuser plate.

10. The backlight unit according to claim 6, wherein the positioning piece is configured at a direction of the centrosymmetric line and integrated with the diffuser plate.

11. The backlight unit according to claim 6 further comprising a plurality of diffuser films in contact with the frame, the fixing apparatus also constraining movement of the diffuser films.

12. A displaying device comprising:
a backlight unit (BLU) comprising
a housing enclosing a plurality of backlight components of the BLU, the housing having a frame, and;
at least a positioning pin formed on the frame; and a diffuser plate placed on the frame comprising:
a fixing hole, symmetrically formed at a centrosymmetric line of the diffuser plate, wherein the fixing hole is assembled with the positioning pin to constrain movement of the diffuser plate on the frame, wherein the positioning pin is located within the fixing hole with a first distance formed between the positioning pin and a first edge of the fixing hole which is parallel to the centrosymmetric line, a second distance formed between the positioning pin and a second edge of the fixing hole which is perpendicular to the centrosymmetric line, and wherein the first distance is smaller than the second distance.

13. The displaying device according to claim 12, wherein the first positioning component comprises a fixing groove, and the second positioning component comprises is a positioning piece projected from the diffuser plate.

14. The displaying device according to claim 13, wherein the positioning piece is located within the fixing groove, a first distance is formed between the positioning piece and a first edge of the fixing groove parallel to the centrosymmetric line, a second distance is formed between the positioning piece and a second edge of the fixing groove perpendicular to the centrosymmetric line, and the first distance is smaller than the second distance.

15. The displaying device according to claim 14, wherein the first distance is determined according to an overall expansion coefficient of the diffuser plate and the second distance is determined according to a mechanical tolerance of the diffuser plate.

16. The displaying device according to claim 14, wherein the positioning piece is projected from the diffuser plate.

17. The displaying device according to claim 14, wherein the positioning piece is configured at a direction of the centrosymmetric line and integrated with the diffuser plate.

18. The displaying device according to claim 14 further comprising a plurality of diffuser films in contact with the frame and a movement of the diffuser films is constrained.

* * * * *